(12) United States Patent
Liou

(10) Patent No.: US 7,861,995 B2
(45) Date of Patent: Jan. 4, 2011

(54) PORTABLE ELECTRONIC DEVICE STAND

(76) Inventor: Abraham Dean Liou, 1302 Spectrum, Irvine, CA (US) 92618

(*) Notice: Subject to any disclaimer, the term of this patent is extended or adjusted under 35 U.S.C. 154(b) by 0 days.

(21) Appl. No.: 12/615,259

(22) Filed: Nov. 9, 2009

(65) Prior Publication Data
US 2010/0213331 A1 Aug. 26, 2010

Related U.S. Application Data

(60) Provisional application No. 61/154,196, filed on Feb. 20, 2009.

(51) Int. Cl.
*A47G 1/24* (2006.01)
(52) U.S. Cl. ............ 248/454; 40/754; 248/459; 248/460
(58) Field of Classification Search ............ 248/454, 248/455, 456, 457, 459, 460, 174, 921; 211/43, 211/195; 40/124.16, 754, 755
See application file for complete search history.

(56) References Cited

U.S. PATENT DOCUMENTS

| | | | | |
|---|---|---|---|---|
| 4,428,555 A * | 1/1984 | Atkins | | 248/459 |
| 4,460,146 A * | 7/1984 | Raggiotti | | 248/456 |
| 5,083,663 A * | 1/1992 | Conway et al. | | 206/45.26 |
| 5,234,190 A * | 8/1993 | Cross | | 248/459 |
| 6,231,023 B1 * | 5/2001 | Morton | | 248/441.1 |
| 6,334,539 B1 * | 1/2002 | Jajko et al. | | 211/42 |
| 7,527,235 B2 * | 5/2009 | Hummel | | 248/459 |
| 2004/0024513 A1 * | 2/2004 | Aizawa | | 248/459 |

* cited by examiner

*Primary Examiner*—Ramon O Ramirez
(74) *Attorney, Agent, or Firm*—David S. Nagy

(57) ABSTRACT

This electronic device stand is a credit-card-sized sheet, equipped with cut-outs and scoring to permit its easy folding into an adjustable stand. The lower half of the card rests on a flat surface, while the upper half of the card is folded upward and is held in place by a tab that folds upward from the lower half to adjustably engage the upper half. A second tab, located at the far end of the lower half, is folded upward to secure the bottom of the electronic device, the back of which is leaned against the erected upper half of the card.

1 Claim, 4 Drawing Sheets

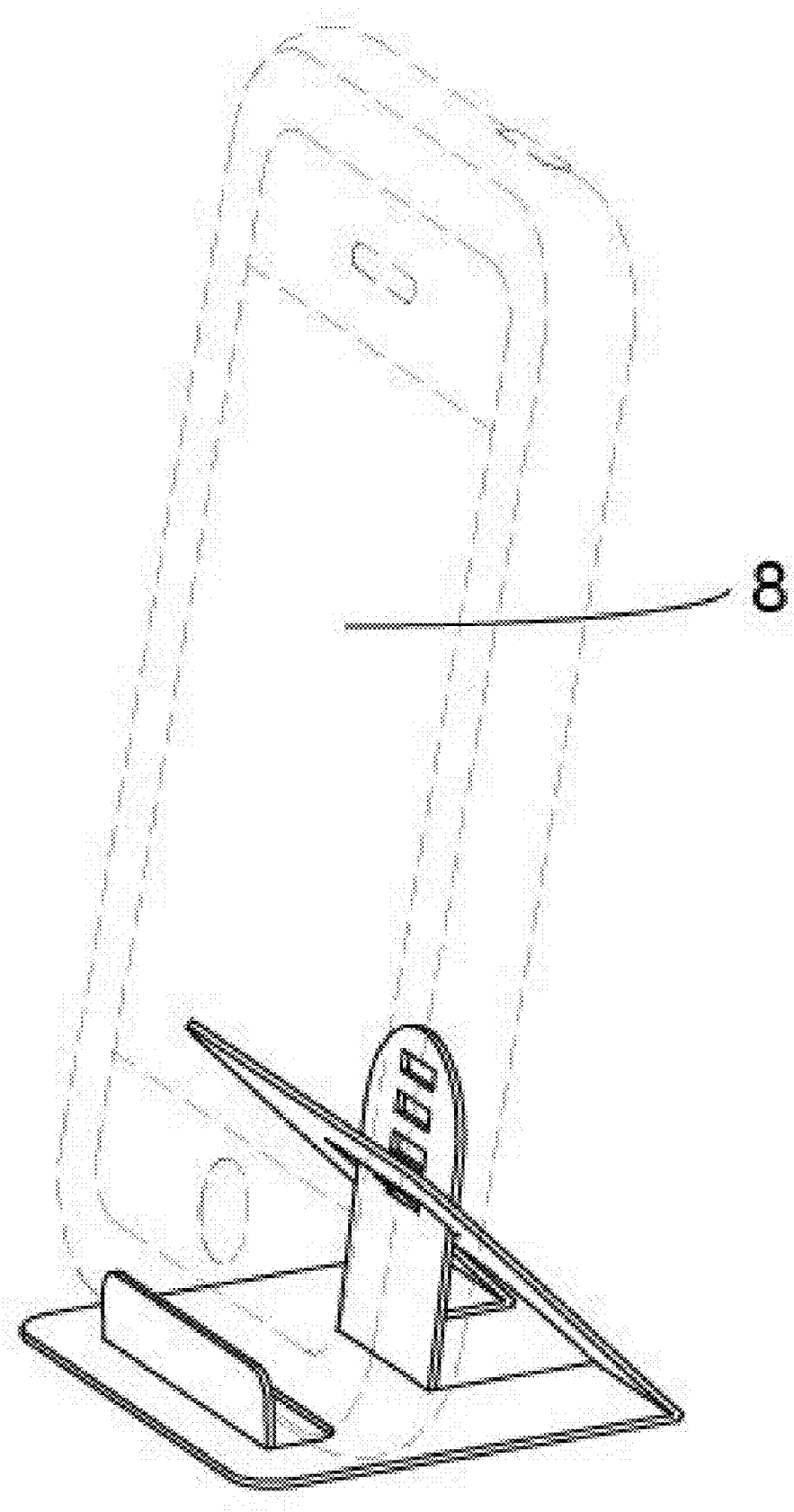

PORTABLE ELECTRONIC DEVICE STAND

CROSS-REFERENCE TO RELATED APPLICATIONS

This application claims the priority of provisional application 61/154,196, of the same title, with the same specification and by the same inventor, filed Feb. 20, 2009.

BACKGROUND OF THE INVENTION

With the proliferation of personal electronic devices, such as cell phones, personal digital assistants (PDAs) and the like, and the inclusion of more and more features within those devices, there is an increasing demand for a way to prop these devices up on a table, desk or other flat surface to be able to view the device's screen at a convenient, glare-free angle while leaving the user's hands free. Previous designs, such as U.S. Pat. No. 6,672,549 to Kolb, and the "Bat Rest" (http://www.seskimo.com) are less stable, relying on the weight of the device to help steady the stand, and requiring rather stiff and/or strong materials, and have been less than satisfactory for those reasons.

BRIEF SUMMARY OF THE INVENTION

This invention, the "bcStand", is an improved stand for such portable personal electronic devices, and is itself supremely portable. Its ingenious design converts easily from its flat, portable state to a very stable stand that does not depend on the weight of the device to help it hold its position and orientation. It is a flat piece of, for example, a flexible plastic material such as polypropylene or polyethylene, from which portions can be folded out and adjustably fitted into each other to provide an angled support for such portable personal electronic devices.

BRIEF DESCRIPTION OF THE DRAWINGS

FIG. 4 shows the invention erected and assembled and adjusted to its steepest setting, supporting a PDA in portrait orientation.

DETAILED DESCRIPTION OF THE INVENTION

Figure 1:
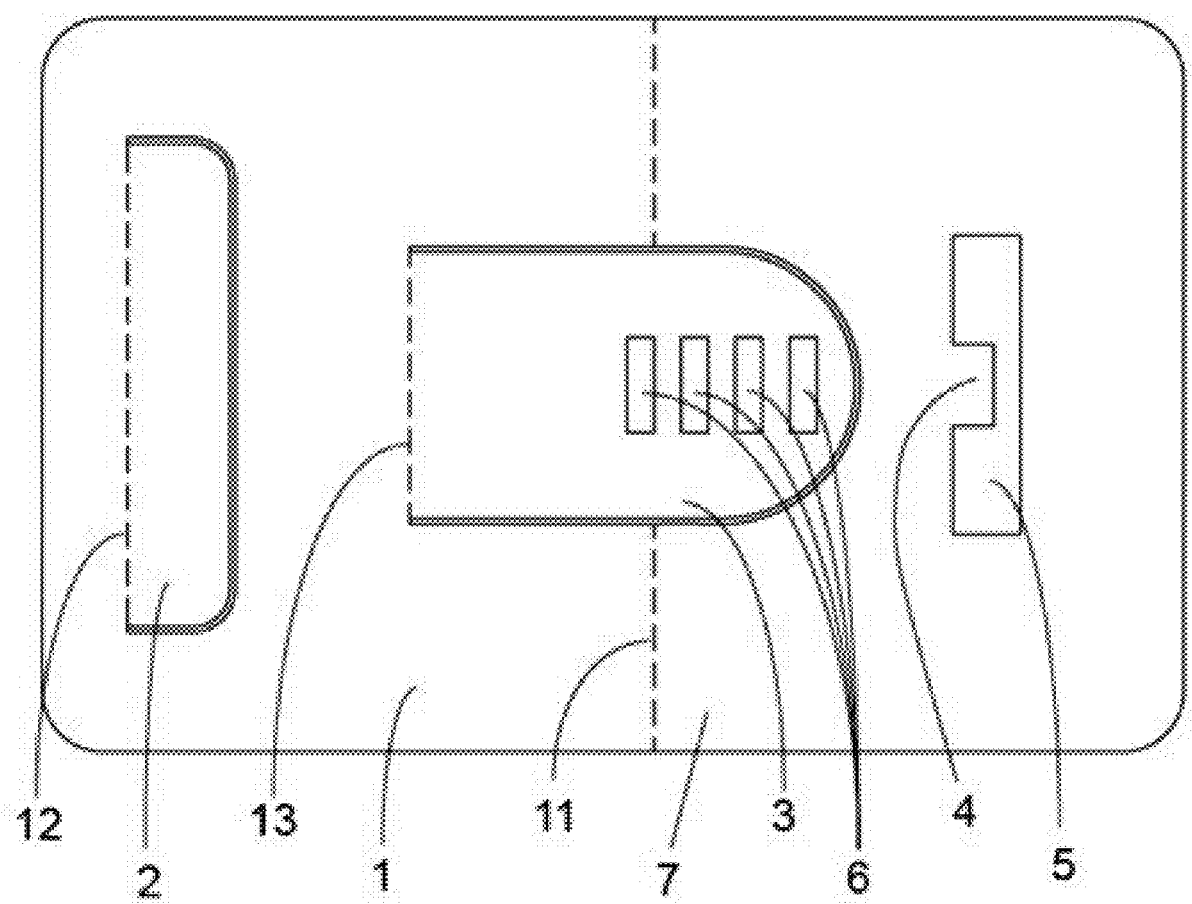
FIG. 1 Shows the invention in plan view, flat and unassembled, as it would be carried by the user prior to use.

This invention is a simple, inexpensive, stable and highly portable stand for PDAs and other personal electronic devices—hereinafter referred to as PDAs for the sake of brevity, but it is understood that this invention is applicable to other electronic devices and, indeed, any item one seeks to have propped up or displayed at a convenient angle. With the increasing sophistication of such devices and their burgeoning array of features and capabilities, and the increasing capacity and inclination to receive and view entertainment, business and other content on such devices, there is a need to be able to readily and reliably prop PDAs up for hands-free viewing.

There have been other attempts at responding to this need, with less-than-complete success. The Kolb invention has to be made of a rather stiff and strong material, since its stand flap (30), not being positively located, depends entirely upon the rigidity of its living hinge attachment to the plate element (12) to be able to keep the stand erected. The use of a very heavy PDA or a particularly shallow viewing angle is likely to tax the integrity of this stand; alternatively, a particularly stiff and strong (read: cumbersome, bulky and heavy) construction is required, and there is always likely to be some "give" in this arrangement given the non-positive location. The BatRest has the problem that lowering its viewing-angle requires spreading the support arms farther apart; this limits the BatRest's use for portrait orientation, as the support arms would be spread too far for all but the most vertical of orientations. Conversely, moving the support arms closer together to raise the viewing angle makes the BatRest less stable. Also, the lack of positive location of the support arms and reliance entirely on the rigidity of its living hinge carries with it the same limitations as cited regarding the Kolb patent, albeit to a lesser degree due to the vertical orientation of the living hinge in the BatRest.

This invention is most effectively produced from a sheet of a bendable material. While this could be materials such as metal or lauan—and indeed, the bcStand can be constructed of essentially rigidly non-bendable material by substituting ordinary hinges for living hinges described below—it is preferably made of a plastic such as polypropylene or polyethylene, which can permit the repeated bending of the material into its assembled position and back to flat, utilizing fold lines that act as living hinges. Optimally and most conveniently, the sheet is approximately the size and thickness of a credit card, although plainly the invention could be practiced with sheets of widely varying sizes. The sheet is equipped with separation lines for the parts of it (2 and 3) that are to be folded out of it, fold lines (11, 12 and 13) which are segments that are weakened or scored or which otherwise facilitate folding along their length, and voids in the material (5 and 6) into which pieces are inserted. These features can be supplied by molding, stamping or other means.

In describing the use of the invention, it is assumed that the sheet is lying flat on a horizontal surface, such as a table, as shown in plan view FIG. 1. The support tab (2) is folded upward along fold line 12 to an essentially perpendicular position, the strut (3) is folded upward by at least a few degrees along fold line 13, and the sheet itself is folded up along fold line 11, with the lower portion of the sheet (1) lying on the horizontal surface and the upper portion of the sheet (7) being folded upward. The act of folding upper portion 7 upward will tend to force the strut 3 upward along with it, until the top of the strut reaches the upper portion void (5), into which the strut will slide until the tang (4) aligns with one of the adjustment notches (6), into which the tang 4 can be inserted—it should be noted that, while the drawings show four adjustment notches 6, the actual number used can range from a single notch to as many as space will permit.

Figure 2:
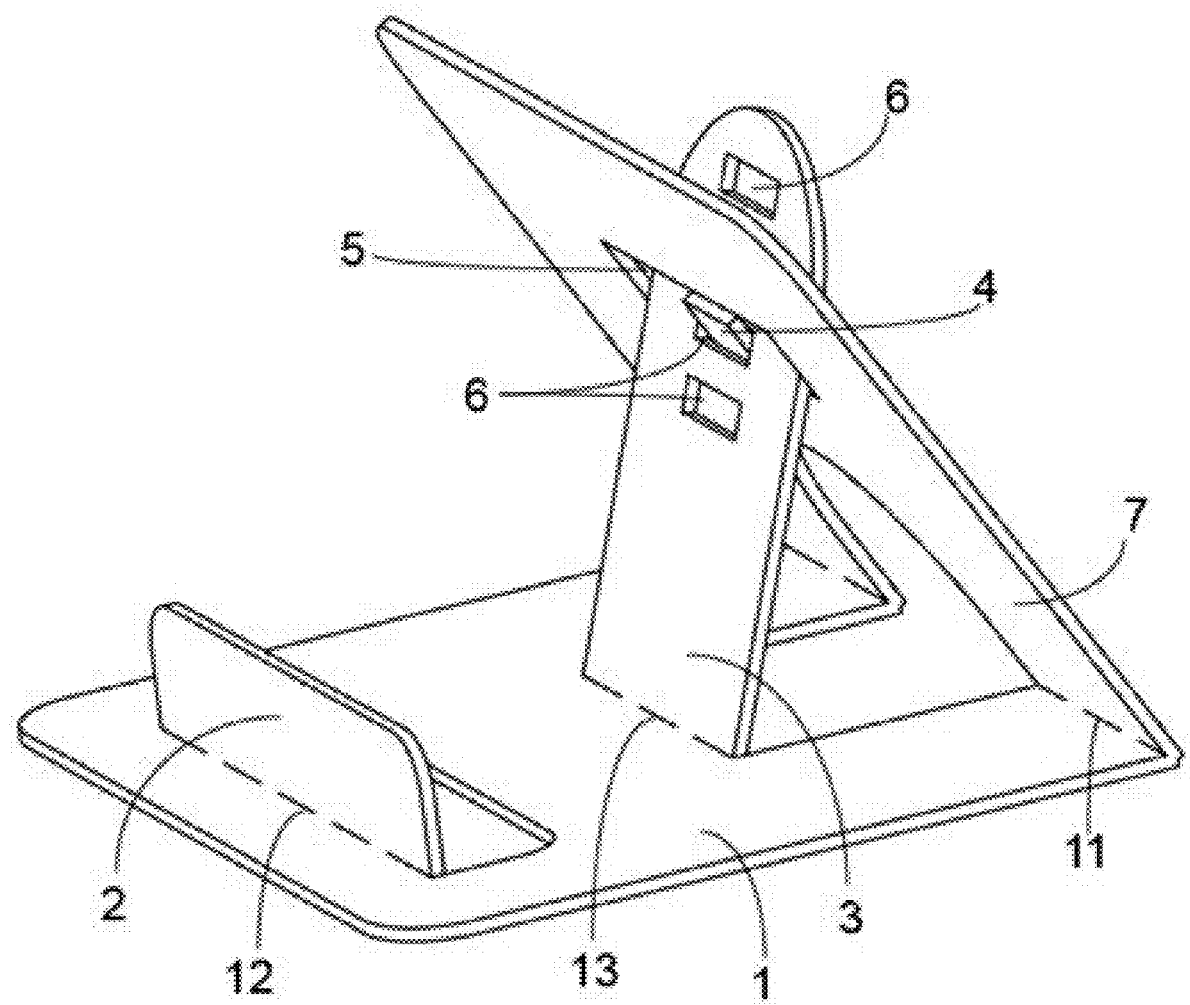
FIG. 2 shows the invention erected and assembled.

FIG. 2 shows the bcStand assembled, with the tang 4 inserted into the third notch 6. It can readily be seen that using the different notches results in a relatively more or less vertical support arrangement for a PDA placed in the bcStand: inserting the tang 4 into the first notch 6—the one closest to the end of the strut 3—results in the least vertical support, while inserting the tang 4 into the fourth notch 6—the one closest to strut fold line 13—results in the most vertical support, and using the other two notches gives results between these two extremes. It is desirable to have the strut 3 be manually opened to less of an angle than is ultimately required, so that when assembled it exerts at least a bit of downward force tending to push the strut back down toward the horizontal surface. In this manner, when a PDA is supported on the bcStand and the upper portion 7 has a tendency to be pushed backward by the weight of the PDA, the strut 3 will not raise and ride over the tang 4—in a construction utilizing ordinary hinges, the weight of the strut 3 would supply this same downward force, and some additional weighting of the strut 3 might be desirable. The weight and pressure of the supported PDA on the bcStand further serve to lock the bcStand in its assembled position, and the width of lower portion 1, the top edge of the upper portion 7 and the support tab 2 contribute additionally to the solidity and stability of the bcStand.

Figure 3:
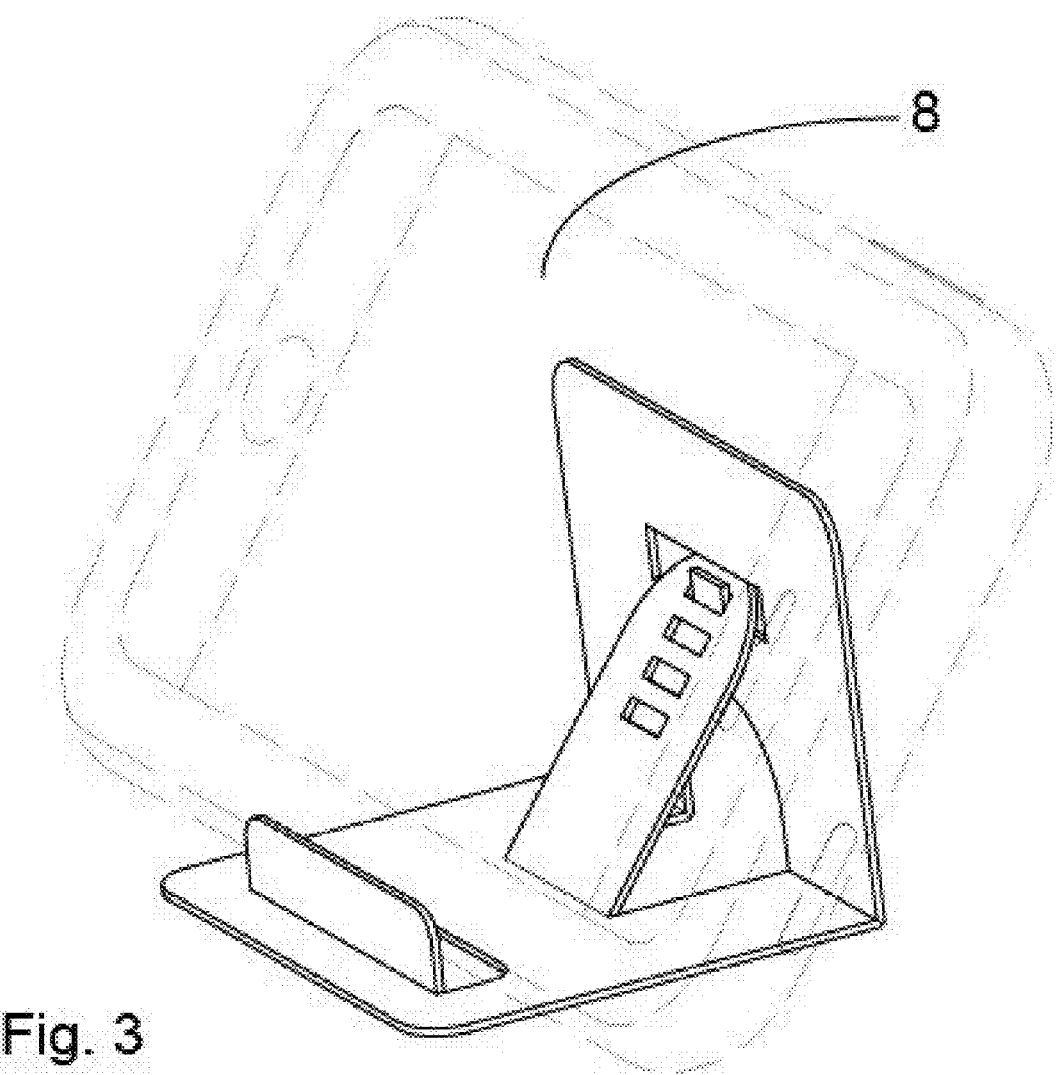
FIG. 3 shows the invention erected and assembled and adjusted to its shallowest setting, supporting a PDA in landscape orientation.

FIG. 3 shows the bcStand assembled, with a PDA (8) supported on it in landscape orientation. Note that tang 4 is inserted into the first notch 6, giving the least-vertical support of the PDA.

FIG. 4 shows the bcStand assembled, with a PDA (8) supported on it in portrait orientation. Note that tang 4 is inserted into the fourth notch 6, giving the most-vertical support of the PDA. While the bcStand is adjustable, the use of a particularly small bcStand with a particularly large PDA, or simply the portrait orientation of a long PDA may require a more vertical orientation to avoid tipping over.

The bcStand is thus, in a preferred embodiment, a credit card-sized sheet of plastic, easily carried in a user's wallet, which quickly converts to a stable stand for a PDA or other portable personal electronic device, superior to the current state of the art yet easy to use and manufacture. It is readily understood that, while the various components of this invention are described and depicted in a certain manner, the invention can be practiced with a wide variety of different shapes and sizes of sheet, support tab 2, strut 3, upper portion void 5, tang 4, notches 6, etc., and can be manufactured of a wide variety of materials.

I claim:

1. A portable electronic device stand, comprising an essentially rectangular sheet made of an essentially rigid material;

said sheet having a first pair of parallel edges at right angles to a second pair of parallel edges, and being divided into upper and lower portions by a dividing fold line parallel to the first edges located near the middle of the second edges;

said sheet having a support tab partially separated from the sheet, and located near the first edge in the lower portion, said support tab being foldable along a fold line parallel to the first edges and capable of rigidly maintaining its position;

said sheet further comprising a strut partially separated from the sheet, said strut having a fold line located in the lower portion parallel to the first edges permitting the folding of the strut away from the sheet, said strut further having one or more adjustment notches which are voids cut or otherwise absent from the sheet;

said sheet further comprising a locking slot in the upper portion sized to accept insertion of the strut, said slot comprising a locking tang sized to be inserted into an adjustment notch;

the sheet being erected into a device stand by placing it on an essentially horizontal surface, and said support tab, upper portion and strut being folded upward along their respective fold lines, so that the strut inserts into the locking slot and the locking tang inserts into an adjustment notch, with the first edge of the upper portion supporting the back of an electronic device and the support tab keeping the base of the device from sliding off of the erected stand.

\* \* \* \* \*